United States Patent [19]
Mori et al.

[11] 4,223,917
[45] Sep. 23, 1980

[54] SEATBELT SYSTEM

[75] Inventors: Mamoru Mori, Okazaki; Shiro Sasaki; Eiichi Kinaga, both of Toyota, all of Japan

[73] Assignee: Toyota Jidosha Kogyo Kabushiki Kaisha, Toyota, Japan

[21] Appl. No.: 10,618

[22] Filed: Feb. 9, 1979

[30] Foreign Application Priority Data

Feb. 9, 1978 [JP] Japan .................................. 53-15168

[51] Int. Cl.³ .............................................. A62B 35/00
[52] U.S. Cl. ..................................................... 280/806
[58] Field of Search ............... 297/468, 469, 474, 475, 297/479; 280/801, 802, 803, 807, 808, 806

[56] References Cited
U.S. PATENT DOCUMENTS 3,929,351  12/1975  Fricko ................................. 297/475
4,101,170  7/1978   Mori .................................... 297/475
4,146,268  3/1979   Bost .................................... 297/475

Primary Examiner—John J. Love
Assistant Examiner—Randall A. Schrecengost
Attorney, Agent, or Firm—Koda and Androlia

[57] ABSTRACT

A seatbelt system wherein the proximal ends of a lap webbing and a shoulder webbing are wound up doubly by a single take-up shaft, the forward portions of said webbings are connected to each other, and the connected portion of the webbings is inserted through an insertion opening of a tongue plate engageable with a buckle for installation of the webbings, said connected portion being provided with a pair of stoppers limiting the movement of the tongue plate and forcedly winding out the webbing wound outside of the other webbing for preventing the webbing wound outside from loosening in a retractor case.

7 Claims, 9 Drawing Figures

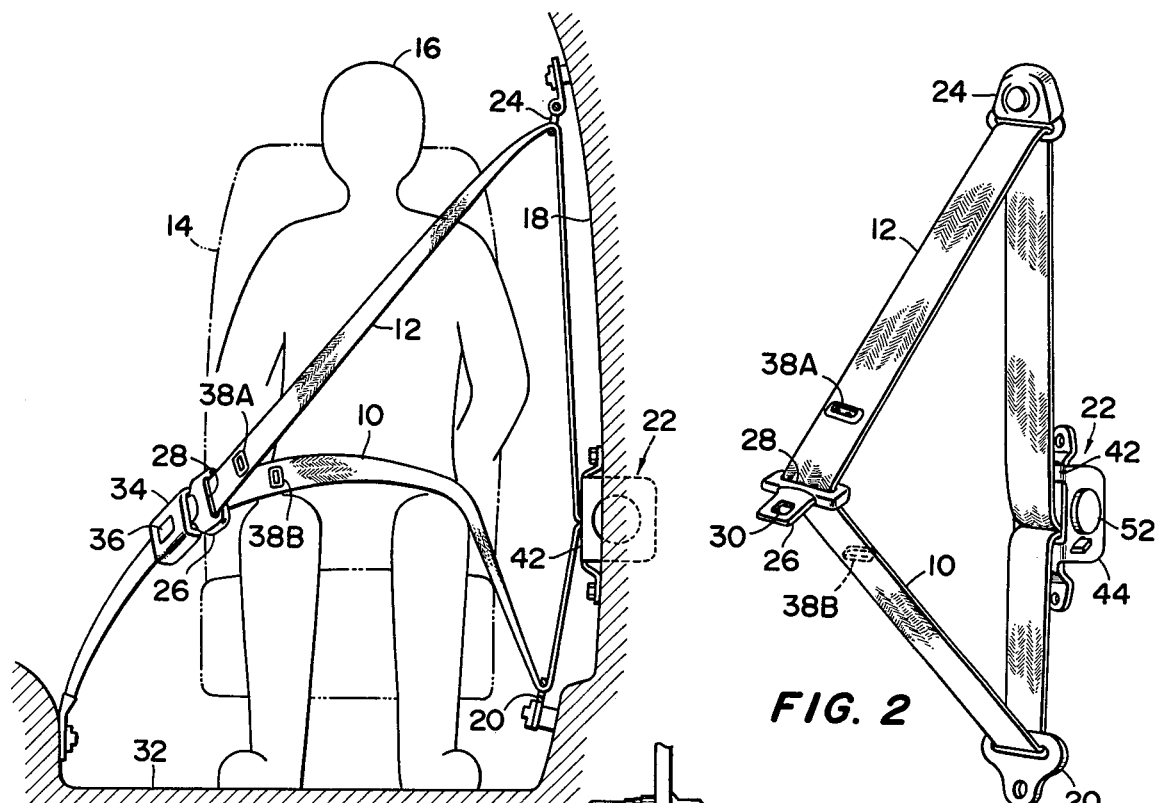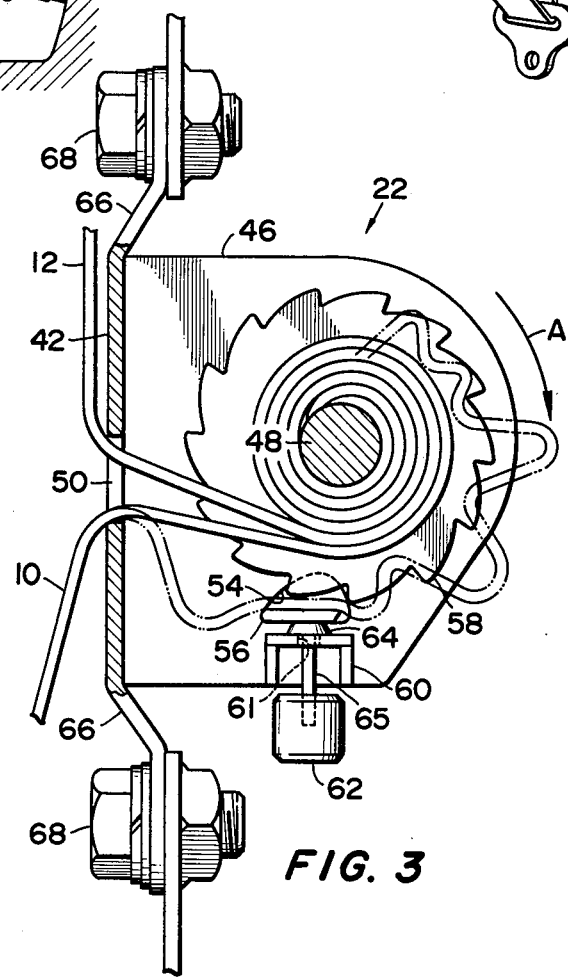

SEATBELT SYSTEM

BACKGROUND OF THE INVENTION

1. Field of the Invention

The present invention relates to a seatbelt system for protecting the occupant by restraining him in an emergency of the vehicle, and more particularly to a seatbelt system wherein a lap webbing and a shoulder webbing can be wound up by a single take-up shaft doubly.

2. Description of the Prior Art

Heretofore, there have been widely used such seatbelt systems that two retractors for separately winding up a shoulder webbing to restrain the shoulder of the occupant and a lap webbing to restrain the lap of him are provided, so that the operations can be smoothly performed by the occupant when he puts the webbings on so as to be restrained and when he releases the restraint, and the motion of the occupant who wears the webbings can be made easy to ensure pleasant fitness.

As against the above, recently, there has been proposed the so-called double wind-up type retractor wherein a lap webbing and a shoulder webbing are doubly wound up by a single take-up shaft, whereby the same functional effect is achieved as the separate retractors are provided for the respective webbings. In this seatbelt system in which the double wind-up retractor is used, use of a single retractor suffices, so that an inexpensive seatbelt system can be provided without hampering the smooth movement of the webbings when the occupant puts on or releases them and pleasant fitness when he wears them, thereby obtaining high evaluation.

However, with this double wound-up type retractor, when only the internally wound webbing out of the doubly wound up webbings is wound out, the outernally wound webbing is wound out following the internally wound webbing and the externally wound webbing thus followingly wound out is not acted on by tension, and hence, may loosened to block the retractor casing. For this, the movement of the occupant may become larger by the value thus loosened in an emergency of the vehicle.

SUMMARY OF THE INVENTION

In view of the above fact, the object of the present invention is to provide a seatbelt system wherein, in the case the externally wound webbing is wound out following the wind-out of the internally wound webbing when the occupant puts the webbings on and loosened in the retractor, the loosening is eliminated after putting the webbings on, thereby enabling to maintain the occupant in a suitable restrained state. The seatbelt system is constructed such that the thicknesses of the portions of the webbing adjacent to a portion where the tongue plate is installed are substantially increased to form into at least two stoppers, whereby the sliding distance of the tongue plate is limited within the interval between the stoppers, so that, when the tongue plate is engaged with the buckle, the webbing loosened in the retractor is forcedly wound out, thereby enabling to maintain the occupant in a suitable restrained state.

Description will hereunder be given of one embodiment of the present invention with reference to the drawings.

BRIEF DESCRIPTION OF THE DRAWINGS

FIG. 1 is a sectional front view showing one embodiment of the seatbelt system according to the present invention;

FIG. 2 is an oblique view showing the arrangement of the parts;

FIG. 3 is a sectional view showing the retractor;

DESCRIPTION OF THE PREFERRED EMBODIMENTS

Figure 4:
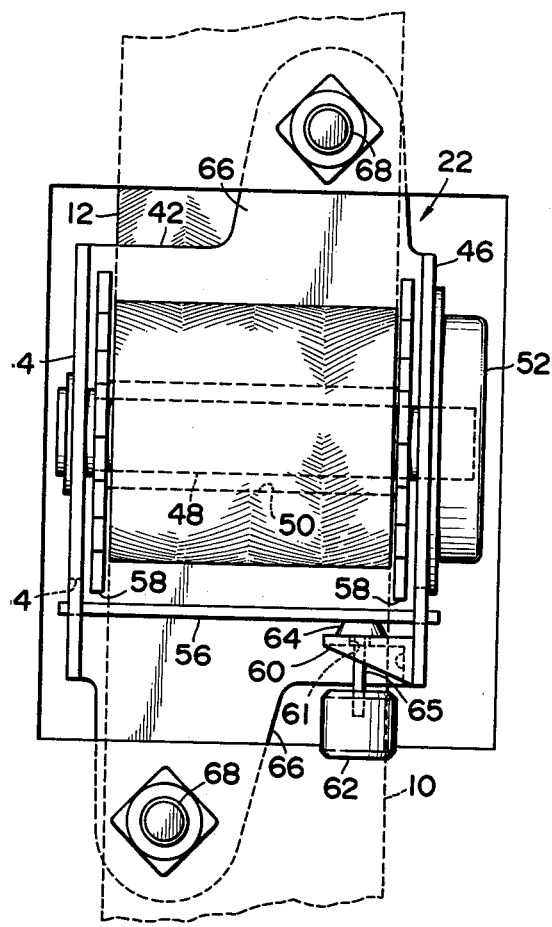
FIG. 4 is a left side view of FIG. 3.

As shown in FIG. 1, the seatbelt system according to the present invention restrains the occupant 16 seated at the seat 14 in the cabin by means of a lap webbing 10 and a shoulder webbing 12.

The intermediate portion of the lap webbing 10 is wound round a through ring 20 installed on the lower portion of the side wall 18 of the vehicle disposed close to one side of the seat 14 and then turned back, and one end is wound up by a retractor 22 provided at the vertically intermediate portion of the side wall 18. On the other hand, the intermediate portion of the shoulder webbing 12, after being turned back at the through ring 24, is wound up by the retractor 22 like the lap webbing 10. Namely, the forward portions of these webbings 10 and 12 are connected to each other with no particular connecting portion being presented. Namely, it is desirable that both webbings 10 and 12 be one integral webbing.

Figure 5:
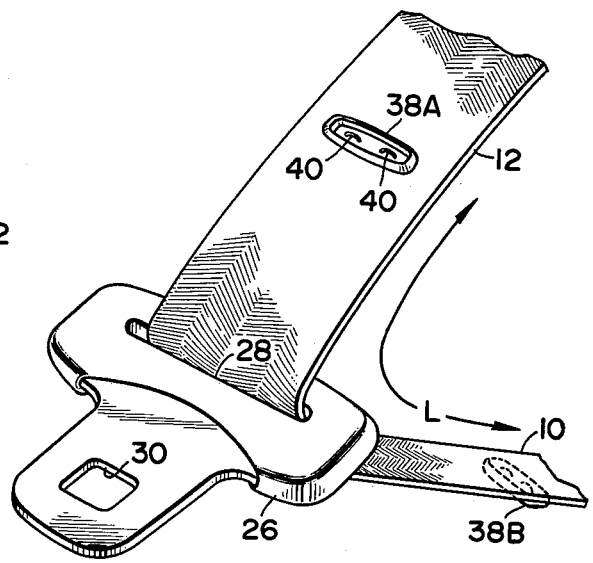
FIG. 5 is an enlarged oblique view showing the mounting of the tongue plate.

As shown in FIGS. 2 and 5, the connecting portion of the webbings is inserted through an insertion opening 28 of the tongue plate 26, while the tongue plate 26 is slidable in the longitudinal direction of the webbings. This tongue plate 26 is penetratingly provided at the forward end portion thereof with an engageable opening 30, and is releasably engaged with known buckle means 34 erectingly provided on a floor portion 32 of the vehicle at a position opposite to the retractor 22 through a sheet 14.

Figure 6:
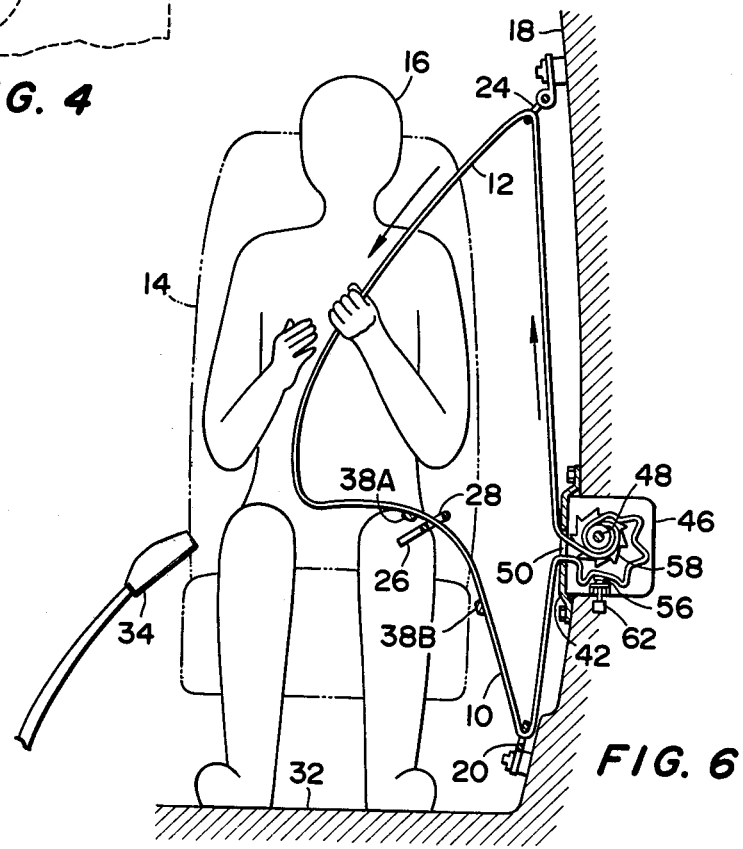
FIGS. 6 and 7 are sectional views showing the wearing operation of the webbings performed by the occupant.
Figure 7:
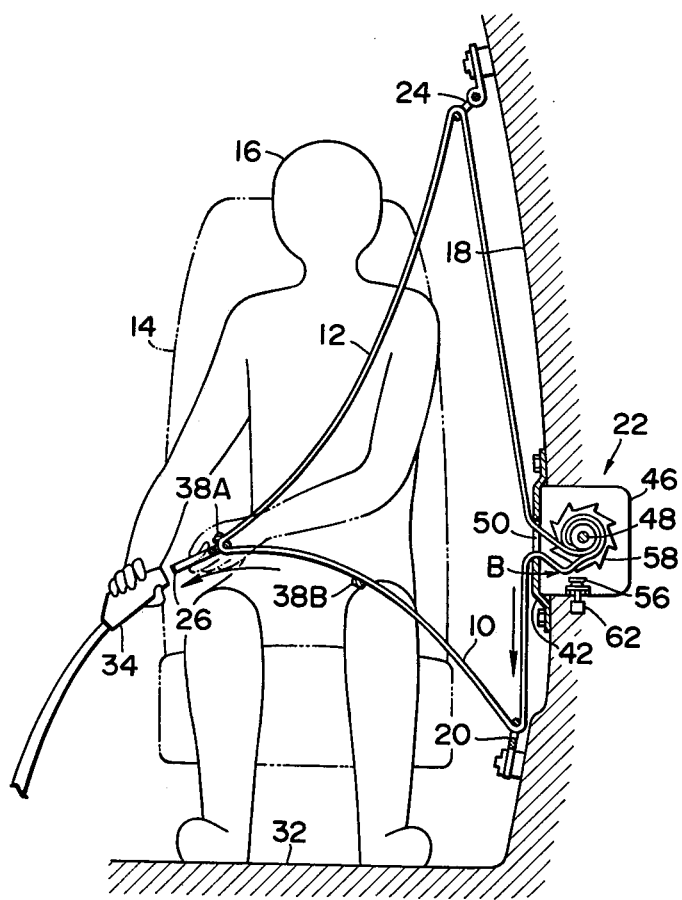

Accordingly, if the occupant 16 seated at the seat 14 engages the insertion opening 28 of the tongue plate 26 with the buckle means 34 as shown in FIGS. 6 and 7, such an arrangement is made that his lap and shoulder can be put under restraint by the webbings 10, 12. In addition, to disengage the tongue plate 26 from the buckle means 34, a release button 36 of the buckle means 34 may be pressed whereby the insertion opening 28 is released from the buckle means 34.

As shown in FIG. 5 in detail, tongue stoppers 38A, 38B are sewn at suitable intervals (length L) on one face of the respective webbings with sewing threads 40 at portions close to the connecting portion of the webbings 10, 12. Consequently, the tongue stoppers are adapted to substantially increase the thicknesses of the webbings. The tongue plate 26 is made slidable between the tongue stoppers 38A and 38B in the longitudinal direction of the webbings, whereby the slidable length of the tongue plate is limited.

Description will hereunder be given of the retractor 22 with reference to FIGS. 3 and 4. A retractor casing 42 is made of a thin sheet metal and has opposite bent legs 44, 46 on both of which a take-up shaft 48 is pivoted. The proximal ends of both webbings 10, 12 inserted through a rectangular window 50 penetratingly provided in the retractor casing 42 are wound round this take-up shaft 48 doubly in layers, with the lap webbing 10 disposed outernally of the shoulder webbing 12. Furthermore, a spiral spring wind-up device 52 is provided on the end portion of the take-up shaft 48 which is projecting from the leg 46 outwardly of the leg 46, and biases and rotates the take-up shaft in the wind-up direction of the webbings. Consequently, as shown in FIGS. 6 and 7, when the occupant puts the webbings on, the take-up shaft 48 is adapted to be rotated in the wind-out direction indicated by an arrow A in FIG. 3 against the biasing force of the spiral spring.

The leg portions 44, 46 are each provided at the lower portion thereof with a triangular window 54 through which a pawl 56 is rotatably received. This pawl 56 is normally maintained horizontally by gravity, but when it rotates, it meshes with a ratchet wheel 58 solidly secured to the take-up shaft 48 to thereby stop the wind-out rotation of both the ratchet wheel 58 and the take-up shaft 48. Additionally, projecting from the leg portion 46 is a bracket 60 which is penetratingly provided therein with a cylindrical hole 61 having a vertical axis. Inserted through this cylindrical hole 61 is a neck 65 connecting a pendulum 62 to a disk-like head 64 with the head 64 mounted on the bracket 60. Mounted on the head 64 is the aforesaid pawl 56, and, when the pendulum 62 detects the acceleration caused by a collision and the like of the vehicle and tilts, the head also tilts on the bracket 60 to rotate the pawl 56.

In addition, connecting pieces 66 projecting upwards and downwards from the retractor casing 42 are secured to the side wall 18 of the vehicle through mounting bolts 68, thereby fixing the retractor 22.

Description will be given of the operation and action of the present embodiment arranged as above. If the occupant engages the tongue plate 26 with the buckle means 34, necessary values of the webbings 10, 12 are wound out from the retractor 22 to put the occupant in a suitably restrained condition as shown in FIG. 1. However, in winding out the webbings from the retractor 22 in the above condition of wearing the webbings, there may be such a case that only the shoulder webbing 12 is wound out as shown in FIG. 6.

In this case, the shoulder webbing 12 is internally wound on the take-up shaft, and hence, the lap webbing 10 externally wound is wound out of the take-up shaft 48 followingly operating with the wind-out of the shoulder webbing as shown by two-dot chain lines in FIG. 3. With no tension acting thereon, the lap webbing 10 is bent and falls into a largely loosened condition within the retractor casing 42. In case the occupant wears the webbings with the lap webbing 10 loosened in the retractor casing as above, there will be such a possibility that the movement of the occupant be increased by the loosened value of the lap webbing in an emergency of the vehicle.

As against the above, the tongue stoppers are provided on the webbings 10, 12, respectively, in this embodiment, and hence, in inserting the tongue plate 26 into the buckle means 34, the tongue plate abuts against the tongue stopper 38A, whereby the lap webbing 10 is forcedly pulled towards the buckle means 34, thus enabling to eliminate the large loosening in the retractor casing 42.

Even if the loosening of the lap webbing remains to a certain extent, the lap webbing 10 moves through the tongue plate 26 towards the shoulder webbing 12 due to the wind-up force of the retractor acting on the shoulder webbing 12, thereby gradually decreasing the loosening of the lap webbing to eliminate it in the end.

In case the vehicle falls in an emergency such as collision, the pendulum 62 tilts to instantly make the pawl 56 mesh with the ratchet wheel 58, whereby the wind-out rotation of the take-up shaft is suddenly stopped, so that the occupant can be reliably restrained by the webbings 10, 12, thus enabling to ensure the safety for the occupant.

In the case the occupant moves his upper body in seated condition at the time of normal running of the vehicle, the tongue plate 26 is movable between the tongue stoppers 38A and 38B, and hence, within this range, the occupant is subjected to a very small feeling of restraint as if there are no tongue stoppers, thereby resulting in pleasant operating conditions.

Description will be given of the positions of mounting the tongue stoppers 38A and 38B. In order to determine the position of mounting of the tongue stopper 38A on the side of the shoulder webbing, it is perferable that an occupant having a small chest and a large abdomen is chosen and the tongue stopper 38A is disposed close to the tongue plate 26 when the occupant wears the webbings (In this case, the tongue stopper 38A is closer to the retractor 22 than in the case of an occupant having a normal physical build.) In the case an occupant having a large chest and a small abdomen wears the seatbelt system designed as above, the tongue plate 26 and the tongue stopper are widely apart from each other and the value of deflection of the lap webbing when worn by the occupant reaches the maximum. However, as aforesaid, the webbings move from the lap side to the shoulder side through the tongue plate 26 due to the tension of the shoulder webbing 12 after the webbings are worn, whereby the deflection is obviated, thereby eliminating the problem.

Additionally, in consideration of the fact that the webbings move from the lap side to the shoulder side when the occupant moves his upper body forwards after putting the webbings on, it is necessary to install the stopper 38B in a manner that an allowance enough not to cause a trouble when the stopper 38B abuts against the tongue plate 26B.

Description has been given of the lap webbing 10 wound up by the take-up shaft externally of the shoulder webbing 12 in the above embodiment. Needless to say, however, the shoulder webbing 12 may be wound up externally of the lap webbing 10.

Figure 8:
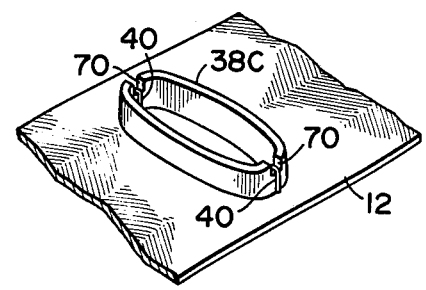
FIGS. 8 and 9 are oblique views showing other tongue stoppers.

Furthermore, the tongue stopper is not limited to the ones shown in the embodiment, but anything which can restrict the slidable length of the tongue plate by substantially increasing the thickness of the webbing can be used as the tongue stopper. An annular tongue stopper 38C may be used which is shown in FIG. 8.

Figure 9:
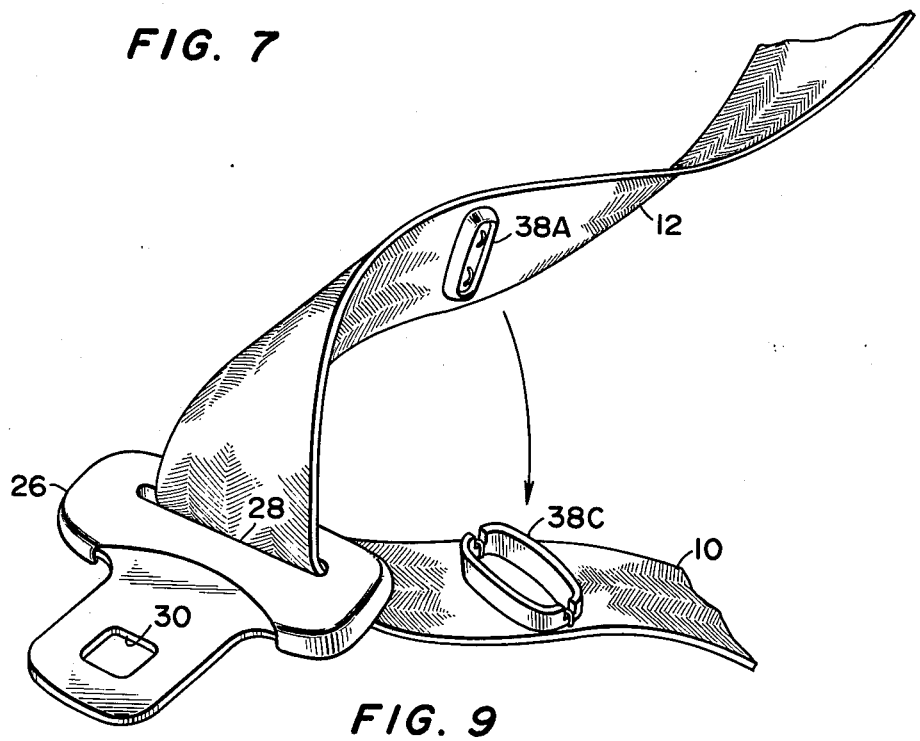

An effect identical with that of the above embodiment can be achieved if sewing threads 40 are suspensively wound round cutouts 70 formed at opposite ends in the longitudinal direction of this elliptical tongue stopper 38C and sewn on the webbing. In addition to the above, the intermediate portion between the sewn portions of the tongue stopper 38C functions as the buffer when the tongue stopper 38C abuts against the tongue plate 26. Further, if the elliptic shape of the tongue stopper 38C is formed into a size into which the tongue stopper 38A in the above embodiment can be fitted and both stoppers are disposed as shown in FIG. 9, it is possible that both tongue stoppers 38A, 38C are coupled to each other as necessary to form the webbing into a ring with which the tongue plate 26 is engaged.

As has been described above, in the seatbelt system according to the present invention, the forward ends of the lap webbing and the shoulder webbing are connected to each other to allow the tongue plate to be slidable and the tongue stoppers are provided for restricting the value of sliding of the tongue plate, and hence, there is presented such an excellent advantage that even if the lap webbing and the shoulder webbing are wound up doubly on the single take-up shaft, one of the webbings is not loosened within the retractor at all, thus eliminating improper restraining conditions for the occupant.

What is claimed is:

1. A seatbelt system wherein the proximal ends of a lap webbing and a shoulder webbing are wound up doubly by a single take-up shaft provided at one side of a seat for an occupant through a biasing force, the forward portions of said webbings are connected to each other, and a tongue plate is provided slidably in the longitudinal direction of the webbings for being engageable with buckle means provided on the other end of said seat for the occupant, characterized in that the thickness of the webbings are substantially increased at portions adjacent the forward connected portions of said both webbings so as to form a pair of stoppers, whereby the tongue plate is adapted to be slidable between said stoppers, thereby limiting the movement of the tongue plate and one of said stoppers is adapted to be engageable with the other whereby when said stoppers are engaged with each other, the webbing is formed into a ring shape and the tongue plate receives the ring therethrough.

2. A seatbelt system as set forth in claim 1, characterized in that said tongue stoppers are sewn onto the webbings, respectively.

3. A seatbelt system as set forth in claim 1, characterized in that said lap webbing is wound up by said take-up shaft outside of said shoulder webbing.

4. A seatbelt system as set forth in claim 1, characterized in that at least one of said tongue stoppers is formed into an elliptic and annular shape and opposite ends in the longitudinal direction are sewed onto the webbing.

5. A seatbelt system according to claim 1 wherein said stoppers are formed into an annular, elliptic shape.

6. A seatbelt system according to claim 5 wherein said stoppers are sewn at longitudinally opposite ends to said webbing.

7. A seatbelt system according to claim 6 wherein said cutouts for being sewn to said webbing are provided at longitudinally opposite ends of said stoppers.

* * * * *